O. L. LOUGHEAD.
OIL FEED INDICATOR.
APPLICATION FILED FEB. 9, 1916.
1,290,260.
Patented Jan. 7, 1919.
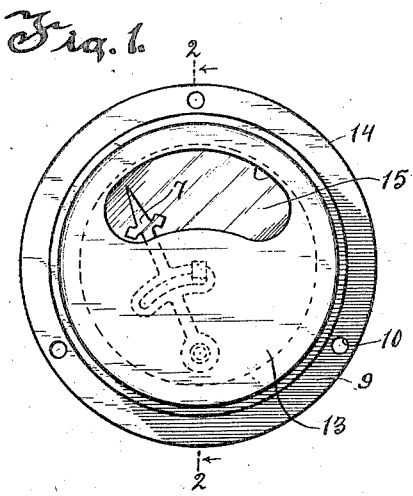
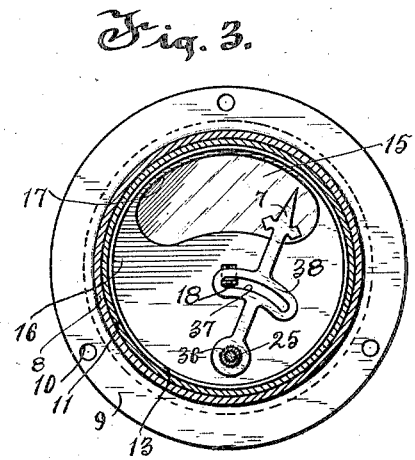
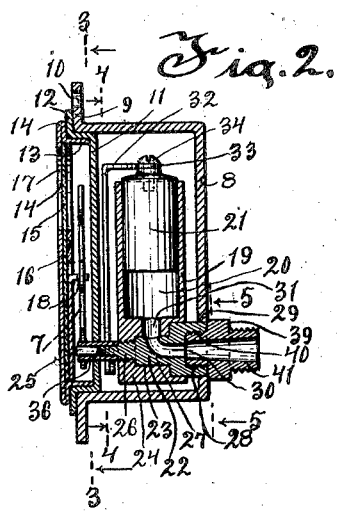
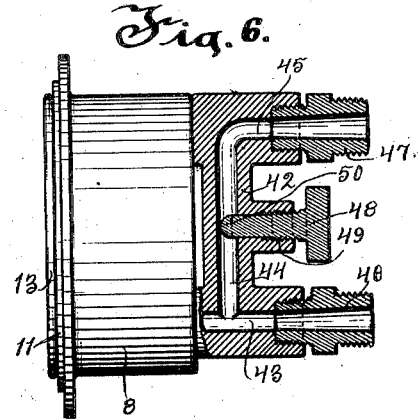
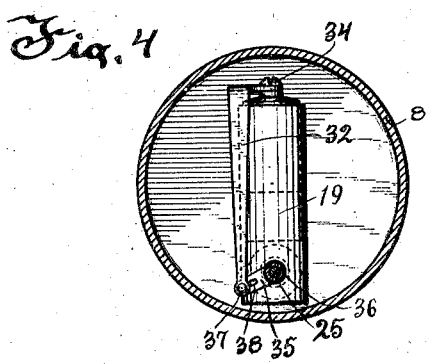
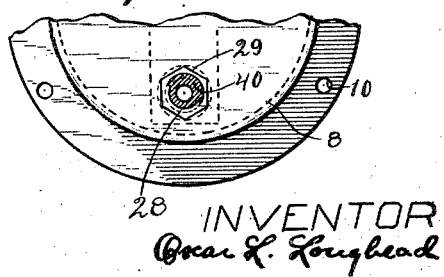
INVENTOR
Oscar L. Loughead
Morsell, Keeney & French
ATTORNEYS

UNITED STATES PATENT OFFICE.

OSCAR L. LOUGHEAD, OF RACINE, WISCONSIN, ASSIGNOR OF ONE-HALF TO ROBERT BALDWIN LANG, OF RACINE, WISCONSIN.

OIL-FEED INDICATOR.

1,290,260.  Specification of Letters Patent.  Patented Jan. 7, 1919.

Application filed February 9, 1916. Serial No. 77,189.

*To all whom it may concern:*

Be it known that I, OSCAR L. LOUGHEAD, a citizen of the United States, and resident of Racine, in the county of Racine and State of Wisconsin, have invented new and useful Improvements in Oil-Feed Indicators, of which the following is a description, reference being had to the accompanying drawings, which are a part of this specification.

The invention relates to oil feed indicators.

The invention is designed more particularly to provide a device for indicating whether the oiling system of an engine, particularly an internal combustion engine, is operating properly.

The common type of indicator for accomplishing this purpose consists in general of a glass tube connected in the oil feed system so that the oil may be visible as it passes through the tube, but the difficulty with an indicator of this kind is that the oil soon soils the tube so that no indication is visible. To obviate this difficulty, I have devised an indicator employing a visible pointer which is adapted to be moved over a dial by a plunger operatively connected thereto and sensitive to fluctuations in pressure of the oil feed system.

The invention is further designed to provide a new and improved form of oil feed indicator.

The invention consists in the several features hereinafter set forth and more particularly defined by a claim at the conclusion hereof.

In the drawings:

Figure 1 is a plan view of the device embodying the invention;

Fig. 2 is a section taken on line 2—2 of Fig. 1:

Fig. 3 is a section taken on line 3—3 of Fig. 2;

Fig. 4 is a section taken on line 4—4 of Fig. 2;

Fig. 5 is a section taken on line 5—5 of Fig. 2;

Fig. 6 is a side view of the device, showing in section a modified form of connector.

The device consists of an indicator and means for connecting said indicator to the oil supply system of the engine so that the indicator is influenced thereby to show the condition of operation of the oil feed mechanism.

The indicator comprises a casing, a pointer 7 within the casing, and means operatively connected to said pointer and sensitive to the variations in pressure in the oil feed system for controlling the movement of said pointer.

The casing consists of a cup-shaped member 8 provided with an annular flange 9 adjacent the open end thereof and with apertures 10 in said flange through which any suitable fastening means may be inserted to secure the indicator to any suitable support, such as the dash-board of an automobile, an inner cover 11 tightly fitting within the open end of the cup-shaped member 8 and provided with an annular flange portion 12 overlapping the flange 9, and an outer cover 13 fitting within the inner cover 11 and provided with a flange 14 overlapping the flange 12 of said inner cover. The outer cover 13 is provided with an aperture 14 for viewing the end of the pointer 7. A sheet of mica or other transparent material 15 is disposed on the inside of the outer cover and is secured in place by a shield or plate 16 which is provided with an opening 17 registering with the opening 14 in the cover, the plate 16 being suitably secured to the outer cover. The plate 16 is also provided with an outwardly extending tongue 18 punched therefrom for a purpose hereinafter described.

The means operatively connected to the pointer for controlling and causing its movement comprises a cylinder 19 provided with a bore 20, a piston or plunger 21 slidably mounted within the bore of the cylinder, means for operatively connecting the cylinder to the connector with the oil supply system, and means for operatively connecting the piston to the indicating pointer.

The means for connecting the cylinder to the connector for the oil supply system comprises a member 22 seated in an aperture 23 in the closed end 24 of the cylinder 19. The member 22 comprises a spindle 25, a threaded portion 26 of larger diameter than the spindle and having threaded engagement with the cylinder 19, a portion 27 of larger diameter than the portion 26 with a hexagonal head 28 which is adapted to be inserted in a hexagonal opening 29 in the bottom of the casing 8. A channel 30 extends through the portion 27 of the member 22 and communicates with a channel 31 which leads to the bore 20 of the cylinder 19.

The means for operatively connecting the piston 21 to the pointer 7 comprises a connecting rod 32, fixedly secured at one end 33 to the front end of the piston 21 by any suitable means, such as a screw 34 and movably secured at its other end to a crank 35 carried by a sleeve 36 loosely mounted on the spindle 25 by a pin 37. The inner end of the pointer 7 is mounted in the sleeve 36. Resultantly the reciprocation of the plunger 21 in the cylinder 20 will, through the rod 32, crank 35 and sleeve 36, cause the oscillation of the pointer 7.

Means are also provided for limiting the movement of the pointer in predetermined extreme positions. This consists of the tongue 18, previously described, which slidably engages in an arcuate slot 37 in an enlarged portion 38 of the pointer, the movement of the pointer being limited by the engagement of the tongue 18 with the ends of the slot 37.

The means for connecting the indicator to the oil supply system of the engine comprises in some instances a coupling member 39 having threaded engagement at its inner end 40 with the member 22 and having threaded engagement at its outer end 41 with a pipe in the oil feed system (not shown). In other instances where the present indicator is designed to take the place of the usual sight feed glass tube indicator, I provide a connection 42, shown in detail in Fig. 6. This connection comprises a member provided with a channel 43 communicating with the channel 30 of the indicator, a transversely extending channel 44 communicating with the channel 43, and a channel 45 forming a continuation of the channel 44, coupling means for securing the connector in the oil feed system comprising couplings 46 and 47 adapted to be connected to pipes in the oil feed system (not shown), and a valve 48 having threaded engagement with a portion 49 of the member 22 and an end 50 which may be moved to regulate the supply of oil passing through the channel 44. The connector 42 is secured to the indicator in the same manner as the connector 39, shown in Fig. 2, by a threaded end (not shown) which engages in the end of the threaded member 22.

With either form of connector, the operation of the indicator is as follows:

If the oil system is working properly, some of the oil will pass into the bore 19 of the cylinder 20 and move the piston 21 outwardly, thus causing the pointer 7 to oscillate from left to right across the face of the inner cover and if the supply of oil is under constant pressure the pointer will practically remain in a substantially fixed position, but in case the oil should fail to feed properly and the pressure in the system be thereby reduced, the pointer will move toward the left and thus indicate to the operator the condition of the oil feed mechanism.

The invention thus exemplifies a simple and efficient device for indicating the condition of the oil supply system for an engine and one in which the indicator is at all times visible and not subject to be soiled by getting in contact with the oil of the system itself.

What I claim as my invention is:—

An oil feed indicator comprising a cup shaped member, a recessed inner cover member fitting within the open end of said cup shaped member and having an opening therein, a cylinder disposed within the casing formed by said members, a spindle projecting through the opening in the cover member and carrying a sleeve, a piston within said cylinder responsive to variations in pressure in the oil supply system, means within said casing connecting the piston and sleeve together to oscillate the sleeve on the movement of the piston, an outer cover member having an annular flange fitting within the recessed portion of the inner cover member and provided with an opening, a piece of transparent material covering said opening, a pointer secured to the sleeve and disposed in the space between the outer and inner cover members, and means on the outer cover coöperating with the pointer to limit its extreme positions of movement.

In testimony whereof, I affix my signature.

OSCAR L. LOUGHEAD.